United States Patent
Starkey et al.

(10) Patent No.: US 8,624,504 B2
(45) Date of Patent: Jan. 7, 2014

(54) STAIRWAY LIGHT FOR WORK VEHICLE

(75) Inventors: Carl R Starkey, Dewit, IA (US); Karl G Heine, Dubuque, IA (US)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 13/440,686

(22) Filed: Apr. 5, 2012

(65) Prior Publication Data

US 2013/0264940 A1    Oct. 10, 2013

(51) Int. Cl.
*H05B 37/02*    (2006.01)
(52) U.S. Cl.
USPC .......................................... 315/131; 315/291
(58) Field of Classification Search
None
See application file for complete search history.

(56) References Cited

U.S. PATENT DOCUMENTS

| | | | | |
|---|---|---|---|---|
| 5,949,198 | A * | 9/1999 | Nakamura et al. | 315/307 |
| 7,940,010 | B2 * | 5/2011 | Patterson | 315/129 |
| 8,415,901 | B2 * | 4/2013 | Recker et al. | 315/307 |
| 2010/0014115 | A1 * | 1/2010 | Sato | 358/1.15 |
| 2010/0020126 | A1 * | 1/2010 | Takahashi | 347/30 |
| 2010/0027093 | A1 * | 2/2010 | Doucet | 359/225.1 |
| 2010/0032776 | A1 * | 2/2010 | Pham et al. | 257/417 |
| 2011/0011620 | A1 * | 1/2011 | Hartmann et al. | 174/133 R |
| 2012/0006212 | A1 * | 1/2012 | Demand | 101/25 |
| 2012/0007484 | A1 * | 1/2012 | Tsai et al. | 312/262 |
| 2012/0020605 | A1 * | 1/2012 | Mori | 384/558 |

* cited by examiner

*Primary Examiner* — Crystal L Hammond

(57) ABSTRACT

A lighting system which may provide supplemental lighting for the stairs of a vehicle under conditions of low ambient lighting. Supplemental lighting may be provided for at least a period of time desired for ingress and/or egress of the operator.

8 Claims, 6 Drawing Sheets

STAIRWAY LIGHT FOR WORK VEHICLE

FIELD OF THE INVENTION

The invention relates to a lighting system, and more particularly, to a lighting system for vehicles with steps or stairs.

BACKGROUND OF THE INVENTION

Many work vehicles such as, for example construction vehicles may be employed at night, i.e., under conditions of low ambient lighting. Such vehicles may be relatively large and may employ ladders, stairs, etc., for operator ingress and egress. Ingress and egress, under low natural lighting conditions, would be more convenient if supplemental lighting was provided to illuminate the stairs or ladders.

SUMMARY OF THE INVENTION

The invention includes a lighting system which provides supplemental lighting for vehicle stairs under conditions of low ambient lighting.

DESCRIPTION OF THE PREFERRED EMBODIMENT

Figure 1:
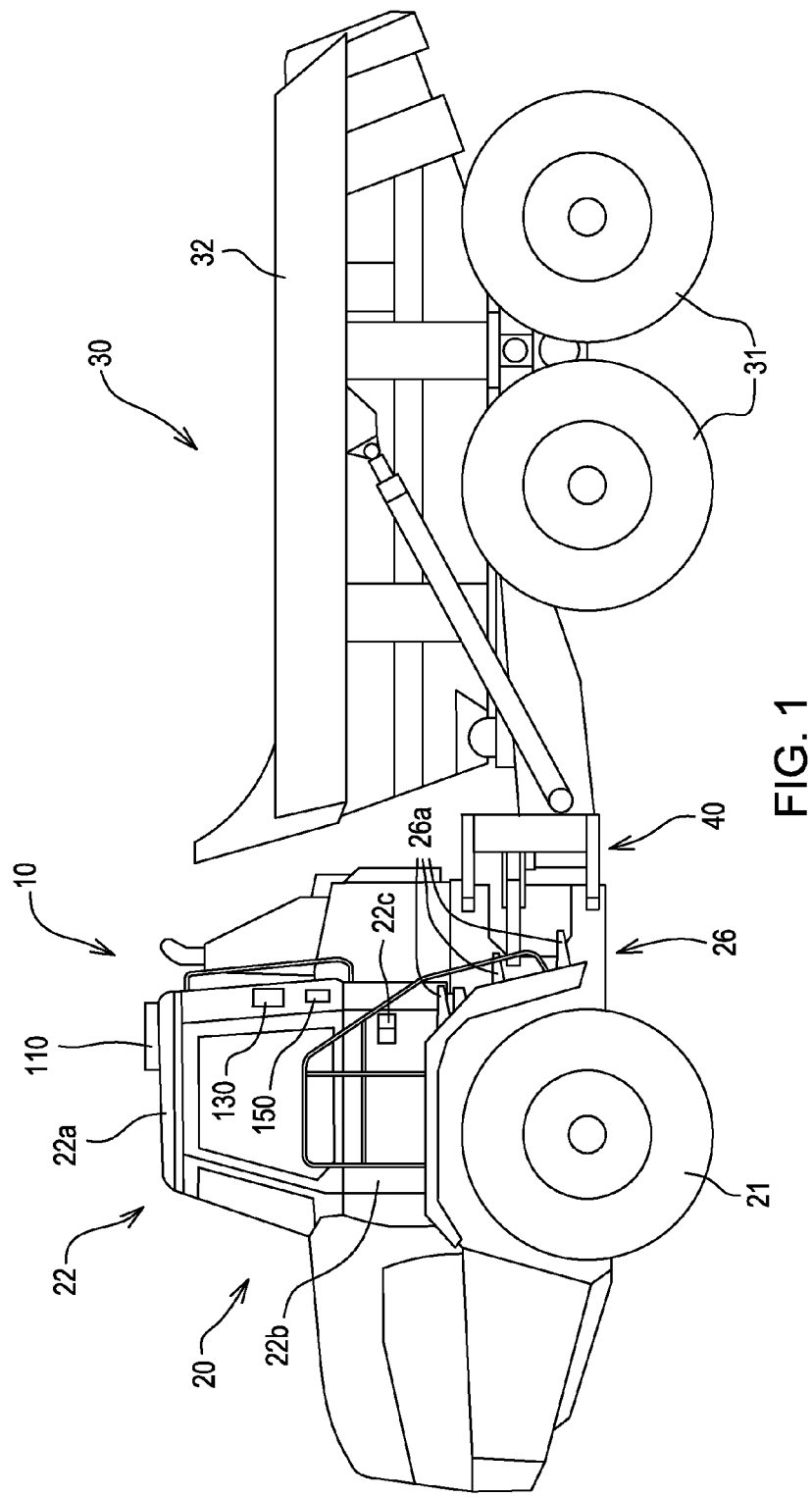
FIG. 1 illustrates a vehicle on which the invention would be useful and on which a first location of a stair light appears.

FIG. 1 illustrates an exemplary embodiment of a work vehicle 10 which could make use of the invention. The particular embodiment illustrated is an articulated dump truck ("ADT") 10 employing an embodiment of the invention, i.e., the stair lighting system 100. This illustrated ADT 10 includes: a front portion 20 which may have a front chassis (not shown), ground engaging front wheels 21, a cab frame 22, a roof 22a, a door 22b, a door handle 22c, a battery 24 an ignition 25 and stairs 26; and a rear portion 30 having a rear chassis (not shown), ground engaging rear wheels 31, and a dump body 32; and an articulation joint 40 allowing angular change between the front portion 20 and the rear portion 30. An exemplary stair light 110 is shown located on the roof 22a, in a position over the stairway 26 enabling it to illuminate the stairs 26 and the door handle 22c.

Figure 2:
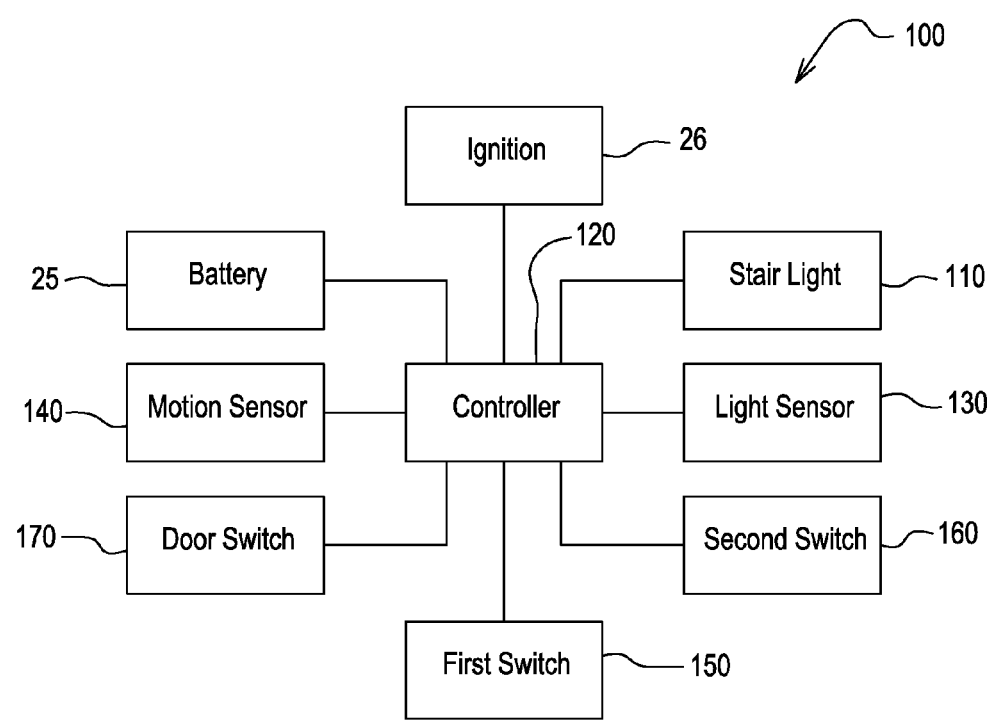
FIG. 2 illustrates a schematic of an exemplary embodiment of the invention.

FIG. 2 illustrates an exemplary schematic of the flow of communication for the stairway lighting system 100 which may include: a stair light 110, a vehicle controller 120, a light sensor 130 positioned to detect the intensity of ambient lighting, a motion sensor 140 which may be designed and positioned on a side of the cab frame 22 to detect operator motion or presence on or near the stairs 26, a first switch 150 and a second switch 160. It gives a simplified view of the lines of communication between elements of the system 100.

Figure 3:
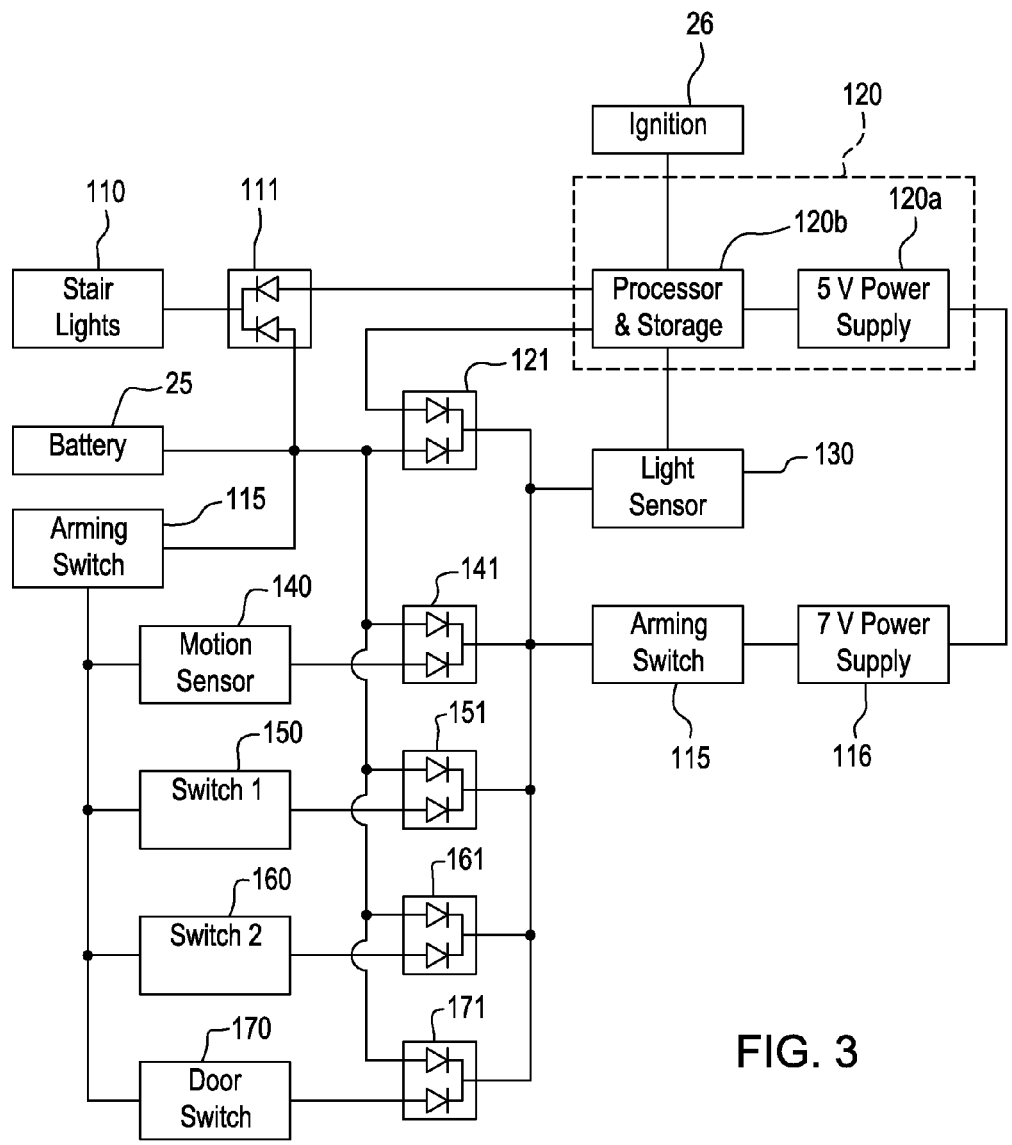
FIG. 3 illustrates a schematic of an exemplary embodiment of the invention with an exemplary latching arrangement.

FIG. 3 illustrates an exemplary schematic of power flow for the stairway lighting system 100 showing details of a latching arrangement which may include: a seven (7) volt power supply 116; a controller 120; a light sensor 130; a motion sensor 140; a first switch 150; a second switch 160; a door switch 170 and corresponding transitors 121, 131, 141, 151, 161, 171. Electrical output for each of the transitors 121, 131, 141, 151, 161, 171 may flow from the line on the output side when electrical power is supplied to each of the two lines on the input side. The controller 120 may include: a five (5) volt power supply 120a; and a processing circuit 120b with a processor and memory and/or storage. Also included in the stairway lighting system 100 may be a battery 25 and, in this particular embodiment, an arming switch 115.

The arming switch 115 may be mechanical or electronic and may respond to a remote signal such as a light or radio signal from a conventional remote control device (not shown) to which it may be designed or programmed to recognize and respond to. It may toggle to between an arming on state and an arming off state. Thus, a first signal from the remote control device may arm the system 100, i.e., connect the battery 25 to the other switches 130, 140, 150, 160, 170 and a second signal from the remote control device may disarm the system 100, i.e., disconnect the battery 25 from the other switches 130, 140, 150, 160, 170. Arming and disarming the system 100 may also include disconnecting, i.e., interrupting the flow of electrical power to the seven (7) volt power supply 116 as illustrated. The arming switch 115 may, in some circumstances, be disarmed or armed by the controller 120 if a line of communication is established between the controller 120 and the arming switch 115.

The first and second switches 150, 160 may be mechanical or electronic and may respond to physical manipulation or to a remote signal such as a light or radio signal from the remote control device to which they (it) may be designed or programmed to recognize and respond. They may also be designed such that activation of one or both of the first and second switches 150, 160, via mechanical manipulation or remote signal, may cause it/them to change state from an off state to an on state for a predetermined minimum time and then revert to the off state. Finally, one of the first and second switches 150, 160 may be designed and located such that it is mechanically manipulated when a weight of the operator is applied to the stairs 26. Such a switch may be purely mechanical or in the form of a strain gage and placed at an interface between the stairs 26 and the cab frame 22. The weight of the operator may be applied to the stairs 26 when the operator steps on any of the stair steps 26a.

The motion sensor switch 140, upon sensing motion, may also enter an on state for the predetermined minimum time and enter into a standby state after the predetermined minimum time is exceeded or an off state if the controller 120 has disarmed the lighting system 100. The predetermined minimum time for the on state of any of the switches 140, 150, 160, 170 may be set to a time required for the controller 120 to power up and latch the lighting system 110 to an on state via a constant supply of electrical energy from, for example, the five (5) volt power supply 120b to the input side of the transistor 121.

Figure 4:
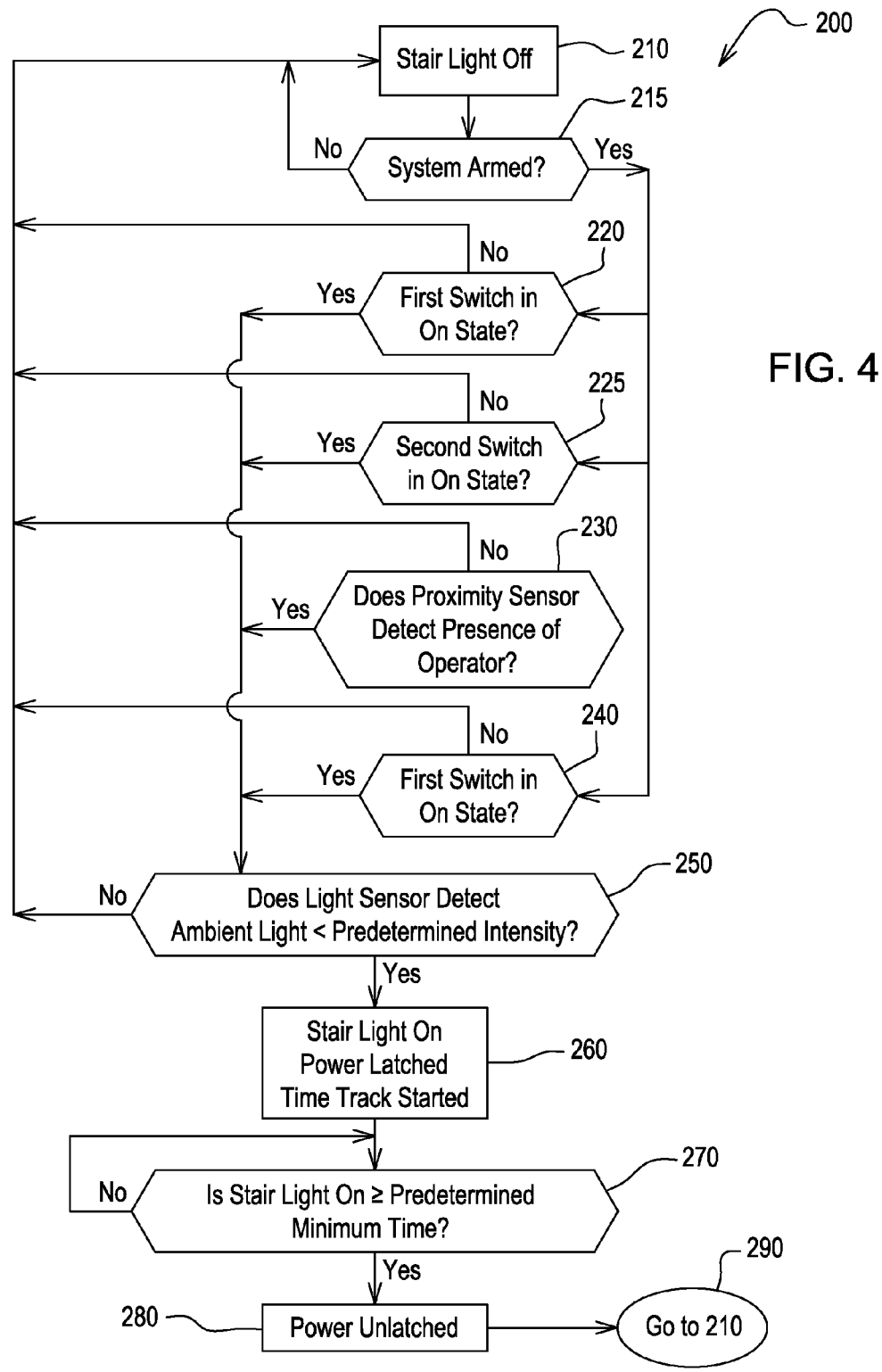
FIG. 4 illustrates a flow diagram for the exemplary schematic illustrated in FIG. 2.

FIG. 4 illustrates an exemplary flow diagram 200 for actions of the controller 120 in the schematic of FIG. 3. The underlying assumptions for the flow diagram of FIG. 3 is that the stair light 110 is initially off at step 210 and the operator is away from the work vehicle 10. If the stairway lighting system 100 is not armed, via the arming switch 115, at step 215, the lighting system 100 returns to step 210 with the stair light 110 off. If the lighting system 100 is armed at step 215, via the arming switch 115, and none of the switches 140, 150, 160, 170 is in an on state, the lighting system 100 returns to step 210. If the lighting system 100 is armed at step 215, via the arming switch 115, and at least one of the switches 140, 150, 160, 170 is in an on state, the controller 120 may check input from the light sensor 130 to determine if ambient light is less than a predetermined intensity. If ambient light is not less than a predetermined intensity at step 250, the lighting system 100 returns to step 210. However, if the ambient light is equal to or greater than the predetermined intensity, the controller latches the power, turns the stair light 110 on and begins to track the time the stair light 110 is on at step 260. The controller 120 keeps the lighting system latched and the stair light 110 on at step 270 until the tracked time is greater than or equal to a predetermined minimum time. Once the stair light has been on for a time equal to or greater than the predetermined minimum time, the power is unlatched by the controller 120 ant the lighting system returns to step 210. and the stair lighting system 100 includes the light sensor 130, then the intensity of ambient light may be detected and if the light sensor 130 indicates the ambient lighting is not less than a predetermined intensity, the controller 120 returns to step 210 with the stair light 110 off. If the light sensor 130 indicates the ambient lighting is less than a predetermined intensity, the stair light is turned on and the controller 120 may begin to track the time the stair light 110 is on at step 260 and may then move to step 270. If, at step 270, the on time of the stair light 110 is less than a predetermined minimum value, the lighting system remains at step 270 and the stair light 110 remains on. Once the stair light 110 is on for a time equal to or greater than the predetermined minimum time at step 270, the controller 120 may unlatch the power at step 280 and, at step 290, return to step 210. The predetermined intensity may be set at any value but may definitely include light intensities at which the operator would find it difficult to see such as, for example, an ambient nighttime light intensity. Likewise, the predetermined minimum time may be set at any value but may, generally, be large enough to allow the operator to safely board or exit the vehicle 10 such as, for example, one (1) minute.

As illustrated in FIG. 4, if the stair light is off at step 210 and the system 100 is armed at step 220, it may determine if the operator is on or near the stairs 26 via the proximity or motion sensor 140 at step 280. If the proximity or motion sensor 140 does not indicate that the operator is on or near the stairs 26, the system may return to step 210 with the stair light(s) off. However, if the motion sensor 140 indicates that the operator is on or near the stairs 26 at step 280, then the system 100 may move to step 240 in the process.

The stair light system 100 may be designed such that the controller 120 and all sensors and switches are directly powered by the battery 24; but in a standby mode when armed and the operator is not present. Thus, the controller 120 and all sensors and switches may consume a small amount of electrical power when armed but a minimum amount of power when the system is unarmed and mechanical switches are used to arm the system as neither the controllers nor the sensors need be powered until the system is armed.

It may be desirable that the system 100 be perpetually armed if the times of operator absence are relatively short. However, there may be times that it is more desirable for the system 100 to be unarmed, e.g., the vehicle 10 will not be operated for an extended period of time, the operator wishes to avoid playful tampering with the lighting of the vehicle 10 by third parties, etc. The system 100 may, once again, be armed by manipulation of the first switch 150 or the second switch 160 either mechanically, or if equipped, by the remote control device.

When the system 100 is equipped with a door switch 170, an opening of the door 22b may cause the door switch 170 to change state from off to on and change the state of the system 100 from unarmed to armed. The underlying assumption here is that the operator is in the cab 22 and is opening the door 22b to exit the vehicle 10. The stair light 110 may be turned on to aid the operator's exit either automatically upon opening of the door 22b or, upon both the opening of the door 22b and the detection of an ambient light intensity that is less than a predetermined minimum if the system is equipped with a light sensor 130. The predetermined minimum intensity for ambient light may be set to any value via programming for the controller 120.

If the system 100 is not equipped with a door switch 170, it may be armed by a change in state of the ignition 25, i.e., the system may be armed when the ignition 25 moves from an on state to an off state. The underlying assumption here is that the operator is preparing to exit the vehicle 10.

The default state of the system 100 may be the last state of the system deliberately chosen by the operator. Thus, if a change in the state of system 100 from armed to unarmed, or vice versa, is last effected via a remote or mechanical manipulation of one of the first and second switches 150, 160, the state of the system 100 may remain as such until a change in state is again effected by a remote or mechanical manipulation of one of the first and second switches 150, 160.

Figure 5:
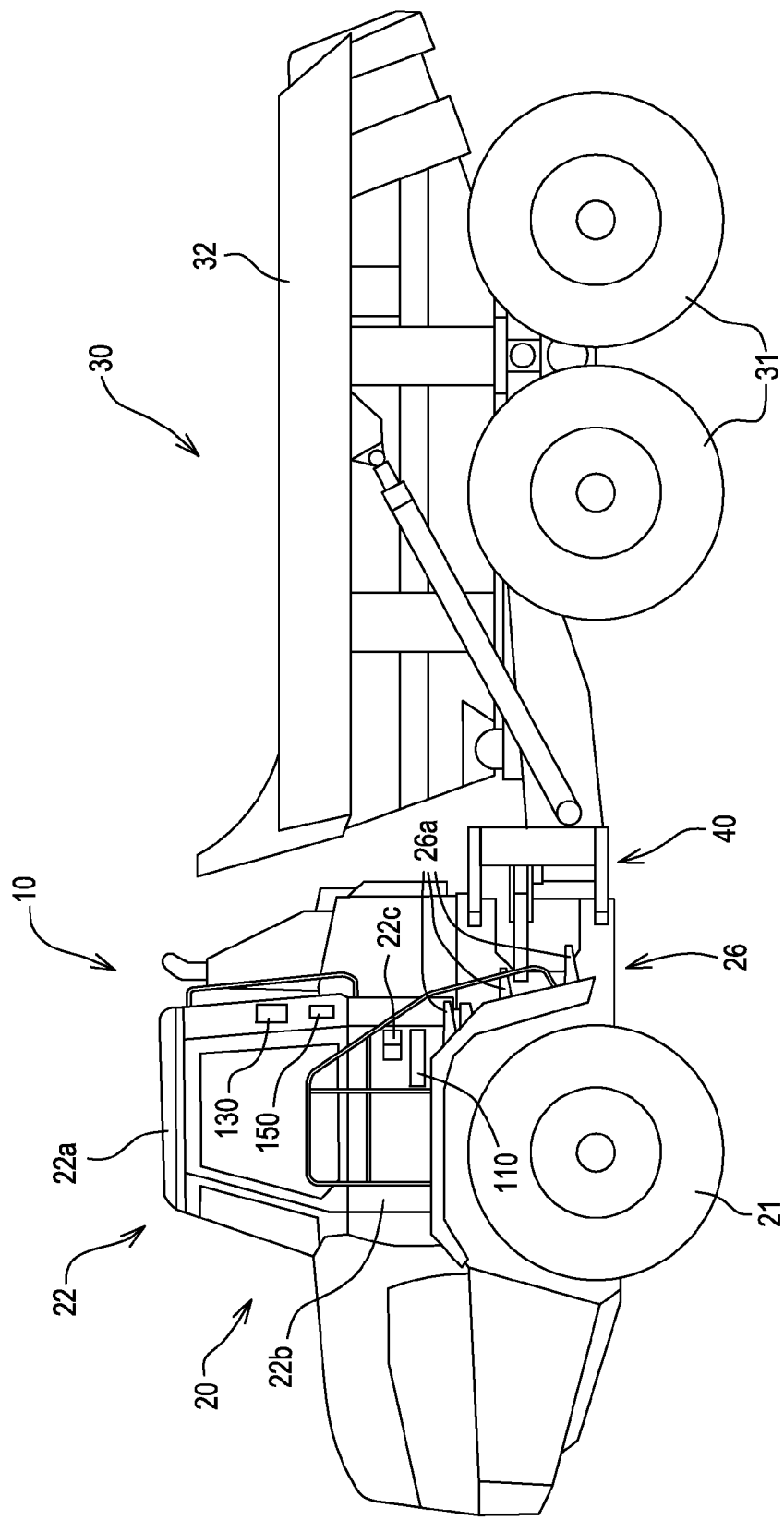
FIG. 5 illustrates a second location for the stair light.

FIG. 5 illustrates the stair light 110 located on a side of the cab frame 22. Such a position may result in illumination of a greater intensity as the stair light 100 is located significantly closer to the stairs 26.

Figure 6:
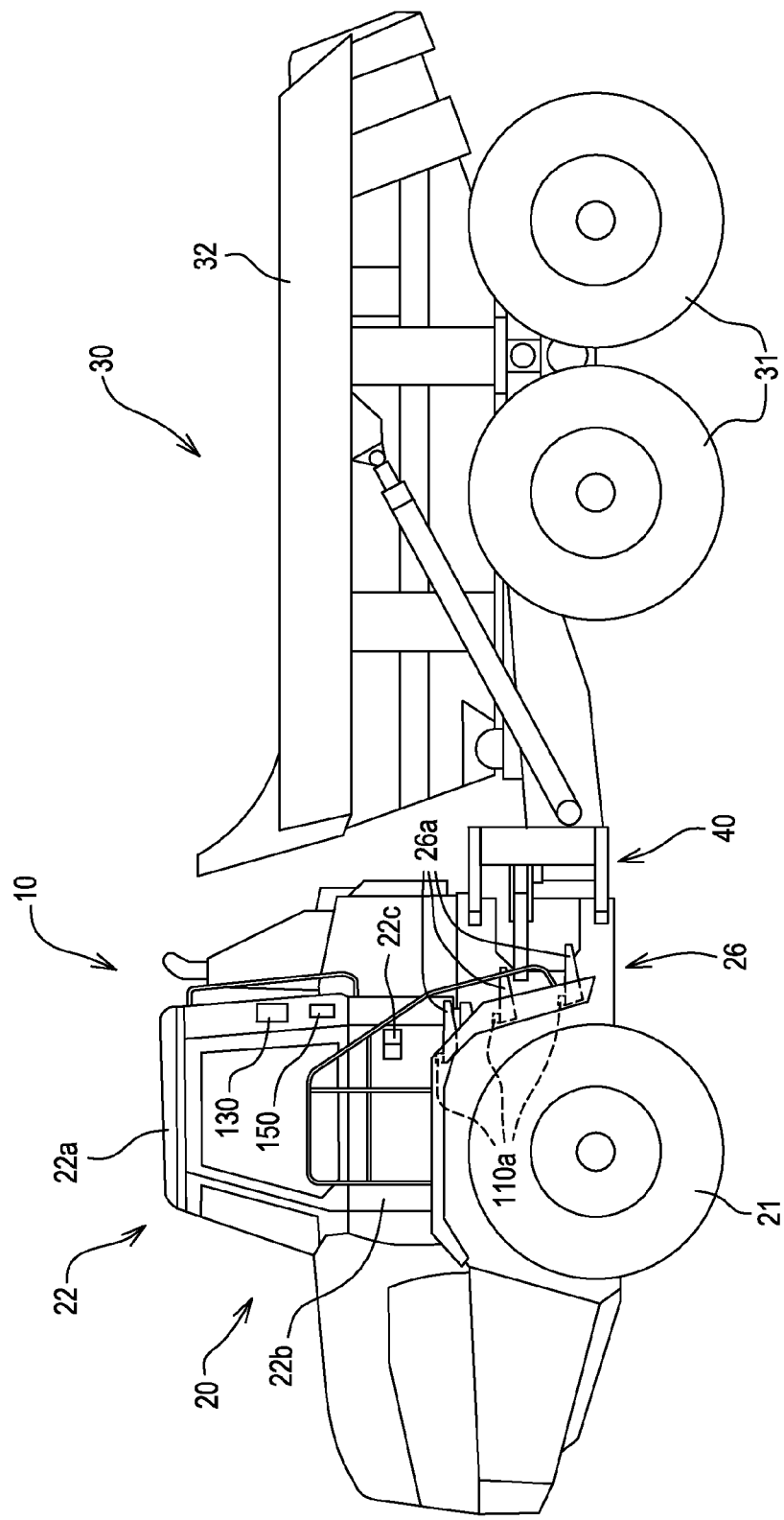
FIG. 6 illustrates a plurality of stair lights directly illuminating the stairs, the door handle and the lock.

FIG. 6 shows the stair light 110 as a plurality of lights 110a directly attached to, and illuminating, the stairs 26 at each step 26a.

Having described the preferred embodiment, it will become apparent that various modifications can be made without departing from the scope of the invention as defined in the accompanying claims.

The invention claimed is:

1. A lighting system for a work vehicle, comprising:
a stair light having a first state and a second state;
an energy storage device;
a controller in communication with the energy storage device and operably connected to the stair light;
a light sensor in communication with the controller; and
a motion sensor in communication with the vehicle controller; the motion sensor having a first motion sensor state and a second motion sensor state, the motion sensor entering the second state when the motion sensor detects motion at a predetermined distance, the controller capable of causing the stair light to enter the second state when the light sensor detects ambient lighting with less than a predetermined minimum brightness and the motion sensor enters the second state.

2. The lighting system of claim 1, wherein the controller is capable of causing the stair light to leave the second state and enter the first state after the stair light has been in the second state for a predetermined length of time.

3. The lighting system of claim 1, wherein the controller is capable of causing the stair light to leave the second state and enter the first state when the ignition leaves the off state placed and enters the on state.

4. The lighting system of claim 1, further including an electrical switch having a switch on state and a switch off state.

5. The lighting system of claim 4, wherein the controller is capable of causing the stair light to enter the second state when the switch enters the switch on state.

6. The lighting system of claim 5, wherein the controller is capable of causing the stair light to enter the first state when the switch enters the switch off state.

7. The lighting system of claim 5, wherein the switch is located on a side of the work vehicle in proximity to the stair.

8. The lighting system of claim 5, further including a vehicle door and a cab frame, wherein the switch is positioned on at least one of the vehicle door and the cab frame.

\* \* \* \* \*